US011329361B2

(12) United States Patent
Niakan et al.

(10) Patent No.: US 11,329,361 B2
(45) Date of Patent: May 10, 2022

(54) HIGH FREQUENCY ANTENNA INTEGRATION IN ELECTRONIC DEVICES

(71) Applicant: Microsoft Technology Licensing, LLC, Redmond, WA (US)

(72) Inventors: Nahal Niakan, Issaquah, WA (US); Sean Mercer, Issaquah, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

(21) Appl. No.: 17/105,006

(22) Filed: Nov. 25, 2020

(65) Prior Publication Data
US 2021/0126340 A1 Apr. 29, 2021

Related U.S. Application Data

(63) Continuation of application No. 16/290,114, filed on Mar. 1, 2019, now abandoned.

(51) Int. Cl.
*H01Q 1/22* (2006.01)
*H01Q 1/52* (2006.01)
*H01Q 13/18* (2006.01)
*G06F 3/041* (2006.01)

(52) U.S. Cl.
CPC .......... *H01Q 1/2266* (2013.01); *G06F 3/041* (2013.01); *H01Q 1/526* (2013.01); *H01Q 13/18* (2013.01)

(58) Field of Classification Search
CPC ...... H01Q 1/2266; H01Q 1/526; H01Q 13/18; H01Q 1/243; H01Q 25/00; H01Q 21/064; H01Q 21/065; H01Q 1/2291; H01Q 1/44; H01Q 21/28; G06F 3/041
See application file for complete search history.

(56) References Cited

U.S. PATENT DOCUMENTS

| | | |
|---|---|---|
| 6,333,716 B1 | 12/2001 | Pontoppidan |
| 6,815,739 B2 | 11/2004 | Huff et al. |
| 6,872,962 B1 | 3/2005 | Barratt |
| 8,469,281 B2 | 6/2013 | Mieslinger |
| 9,836,689 B2 | 12/2017 | Schmid |
| 2009/0251384 A1 | 10/2009 | Ligtenberg et al. |

(Continued)

FOREIGN PATENT DOCUMENTS

| | | | |
|---|---|---|---|
| CN | 102683861 A | * 9/2012 | ............ H01Q 1/243 |
| CN | 108199139 A | 6/2018 | |

(Continued)

OTHER PUBLICATIONS

"International Search Report and Written Opinion Issued in PCT Application No. PCT/US2020/018932", dated May 15, 2020, 15 Pages.

(Continued)

*Primary Examiner* — Renan Luque
(74) *Attorney, Agent, or Firm* — Holzer Patel Drennan

(57) ABSTRACT

An electronic device with high frequency antenna integration is described herein. The electronic device may comprise a trackpad and at least one antenna element. The trackpad is configured in a housing to receive input. The at least one antenna element is operable in a high frequency range integrated into a region adjacent to the trackpad, wherein at least a portion of the region is transparent to radio wave transmission enabling a dual use of the region.

26 Claims, 11 Drawing Sheets

(56) References Cited

U.S. PATENT DOCUMENTS

| | | |
|---|---|---|
| 2009/0316612 A1 | 12/2009 | Poilasne et al. |
| 2011/0156966 A1 | 6/2011 | Taniguchi et al. |
| 2011/0169770 A1 | 7/2011 | Mishina et al. |
| 2012/0162032 A1 | 6/2012 | Yang et al. |
| 2013/0027255 A1* | 1/2013 | Ito .................. H05K 9/0022 343/702 |
| 2013/0341409 A1 | 12/2013 | Wu et al. |
| 2015/0042528 A1 | 2/2015 | Jung |
| 2015/0303561 A1 | 10/2015 | Yang et al. |
| 2015/0331507 A1 | 11/2015 | Shachar et al. |
| 2017/0117635 A1 | 4/2017 | Ganchrow et al. |
| 2017/0249032 A1 | 8/2017 | Konopka |
| 2017/0301986 A1 | 10/2017 | Nguyen et al. |
| 2018/0026341 A1 | 1/2018 | Mow et al. |
| 2020/0119432 A1 | 4/2020 | Mizunuma et al. |
| 2020/0280120 A1 | 9/2020 | Niakan et al. |

FOREIGN PATENT DOCUMENTS

| | | |
|---|---|---|
| EP | 2797240 A1 | 10/2014 |
| WO | 2018043999 A1 | 3/2018 |

OTHER PUBLICATIONS

Horwitz, Jeremy, "Intel's 5G laptop prototype reveals key challenge: antenna design", Retrieved from: https://venturebeat.com/2018/02/28/intels-5g-laptop-prototype-reveals-key-challenge-antenna-design/, Feb. 28, 2018, 3 Pages.

* cited by examiner

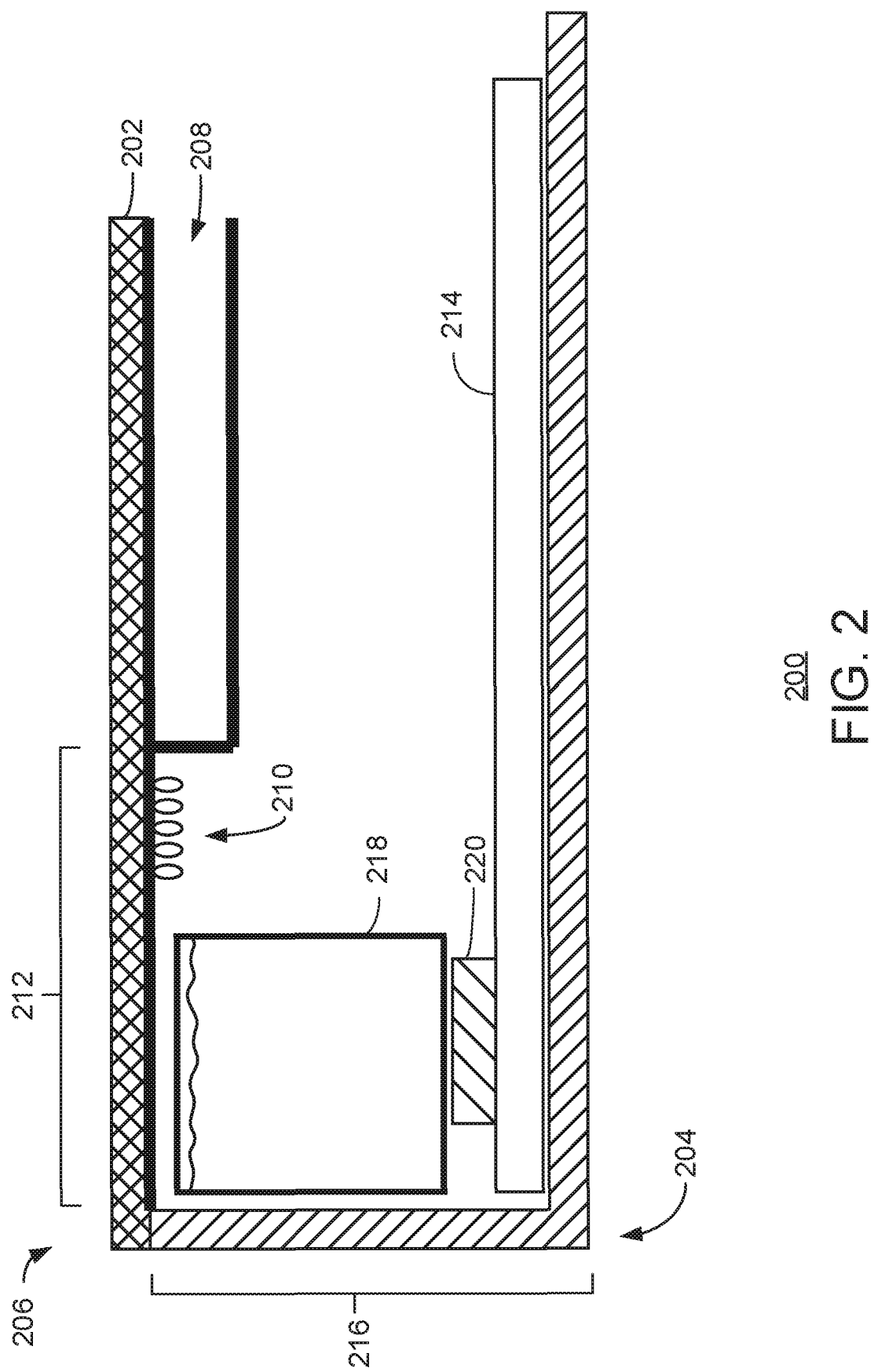

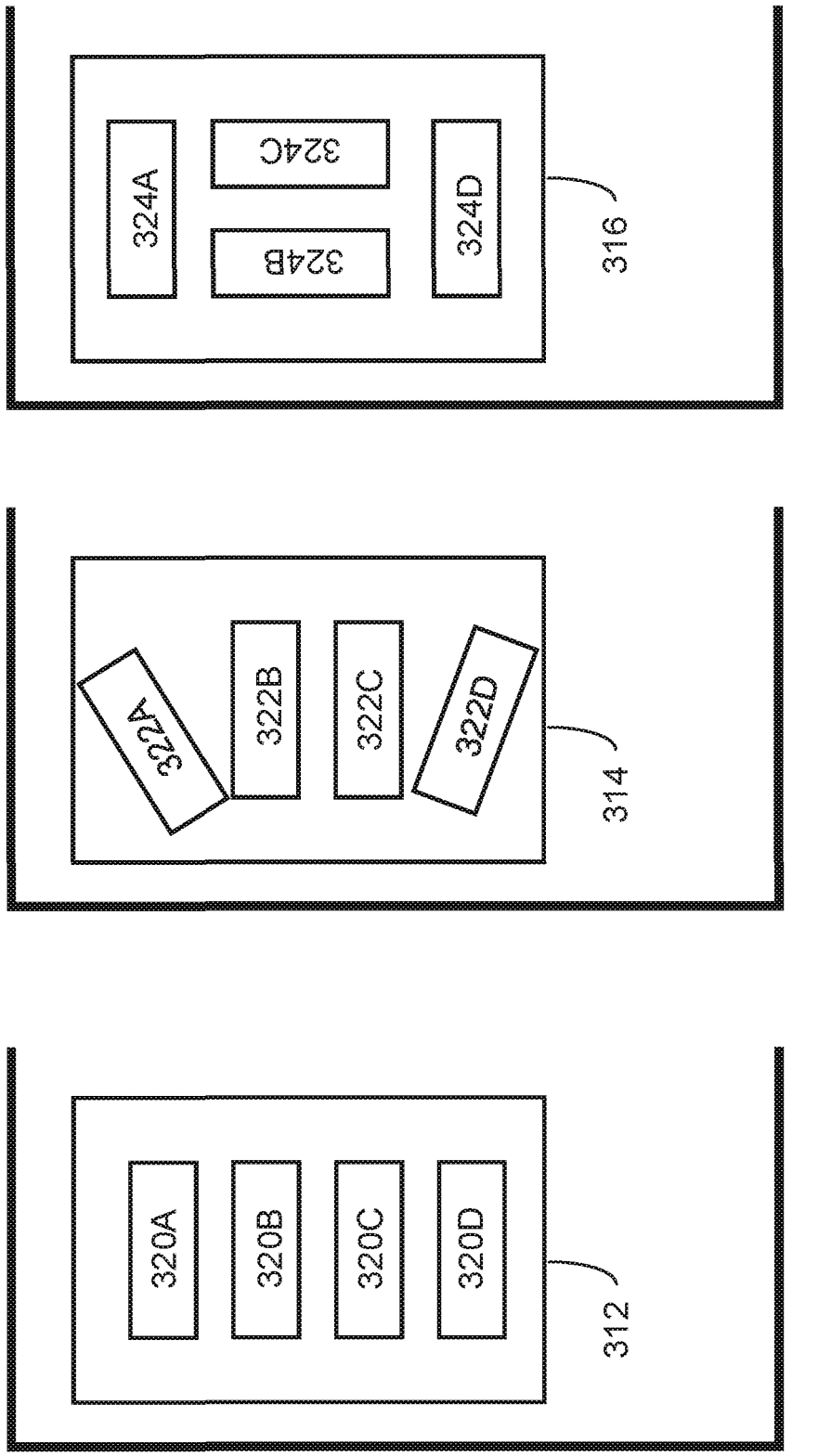

700

HIGH FREQUENCY ANTENNA INTEGRATION IN ELECTRONIC DEVICES

CROSS-REFERENCE TO RELATED APPLICATIONS

The present application is a Continuation of and claims benefit of priority to U.S. patent application Ser. No. 16/290,114, filed Mar. 1, 2019, entitled "High-Frequency Antenna Integration in Electronic Devices" which is specifically incorporated by reference for all that it discloses and teaches.

BACKGROUND

Antennas may operate within different frequency bands to transmit or receive information. For example, a radio wave at or near the 24-40 Gigahertz (GHz) frequency range may be referred to as a millimeter wave (mmWave), and antennas that operate at or near this range referred to a mmWave antennas. Communication using mmWave frequencies enables the establishment of fifth generation (5G) communication networks. Antennas may also operate in even higher frequency ranges, thereby supporting future generations of networks, such as a sixth generation (6G) communication network and beyond.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, an electronic device is described. An electronic device. The electronic device may comprise a trackpad and at least one antenna element. The trackpad is configured in a housing to receive input. The at least one antenna element is operable in a high frequency range integrated into a region adjacent to the trackpad, wherein at least a portion of the region is transparent to radio wave transmission enabling a dual use of the region.

In another embodiment described herein, a system is described. The system comprises at least one antenna element, a substrate, an electronic component coupled with the substrate, and a housing. The at least one antenna element is integrated with an internal structure of the housing, and at least one of the substrate or the electronic component are associated with the internal structure enabling a dual use of the internal structure.

Another embodiment described herein includes an apparatus. The apparatus comprises a housing, wherein a plurality of electronic components is disposed within the housing and a portion of the housing comprises a region of metallization and a slot antenna array that is integrated into the region of metallization.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

FIG. 2 is a cross section of an electronic device;
FIG. 3 is an illustration of three slot antenna configurations.

DETAILED DESCRIPTION

Figure 1A:
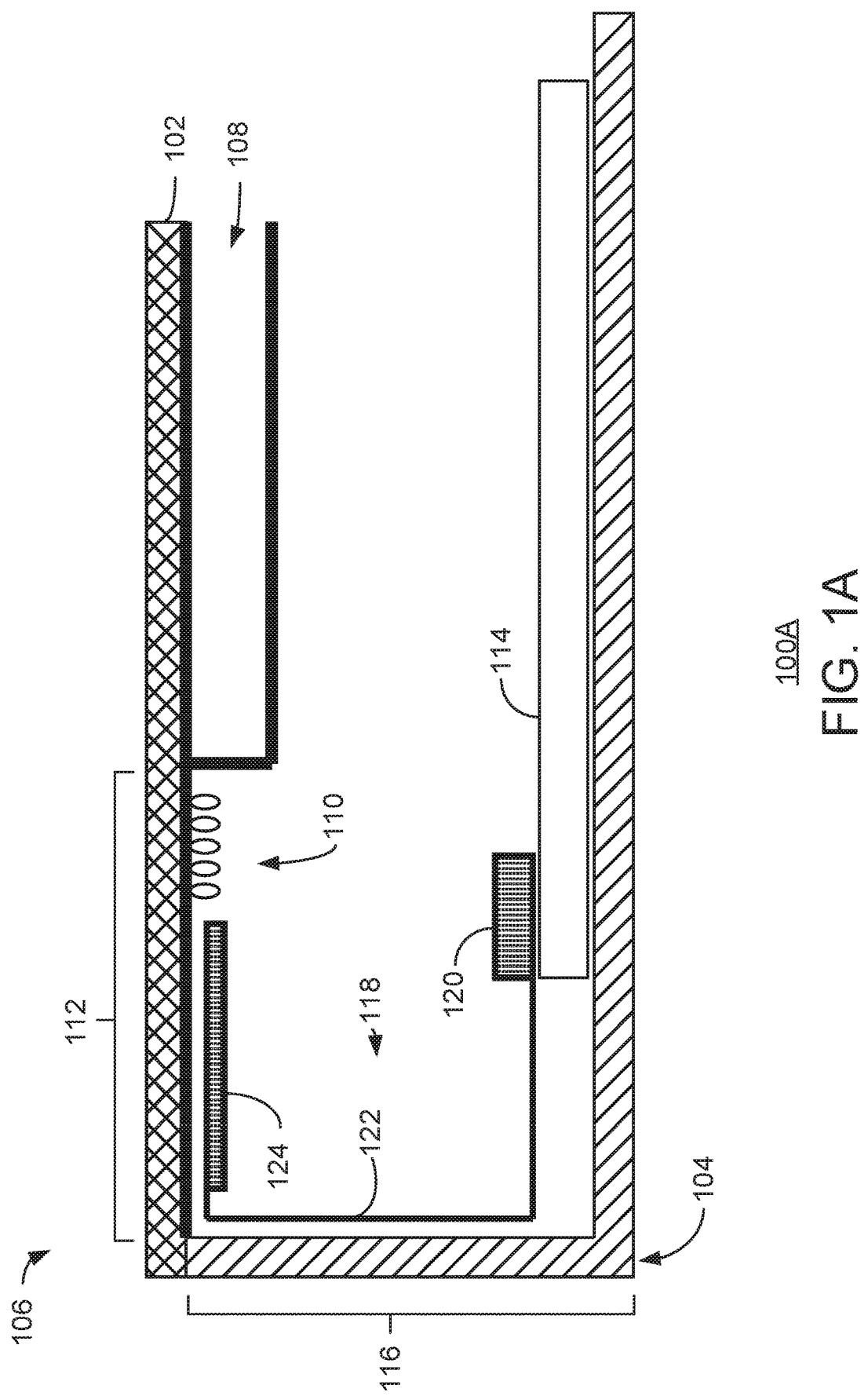
FIG. 1A is a cross section of an electronic device.

Free space within electronic devices is hotly contested between different subsystems, including antennas. As electronic devices evolve, the industry trends toward thinner, lighter devices. Combining thinner, lighter devices with increasingly advanced radio solutions, such as 4×4 Multiple Input Multiple Output (MIMO) Long-Term Evolution (LTE), 5G sub-6 GHz, 5G mmWave, 6G, and the like, finding free internal space within electronic devices will be more difficult. Moreover, the design of these electronic devices seeks to maximize the usable screen display area relative to the total device geometry. Thus, there is significant contention between competing device subsystems, such as the display, antennas, cameras, audio, connectors, input/output devices, and so on for this precious internal device volume.

The evolution of electronic devices has also spurred ever-increasingly higher frequencies of operation. As follows, the antennas within electronic devices have evolved to operate at higher and higher frequencies. By operating at a higher frequency, the resulting wavelengths used in the communication (transmission or reception) of information are much shorter than is typically observed when operating at lower frequencies. For example, information sent via mmWave communications is transmitted via a shorter wavelength when compared to the wavelength observed in WiFi or Long-Term Evolution (LTE) cellular communications. The shorter wavelength enables high frequency antennas that are very viable and physically smaller than antennas operating at a lower frequency.

Smaller antennas result in the availability of regions or spaces on or within an electronic device for mounting the antenna that may not have been viable spaces for antennas, antenna elements, or antenna arrays in the past. In other words, the use of high frequency antennas enables additional structures within an electronic device to host the antenna while still being used for the structure's original purpose. While particular frequency bands as they relate to types of communication have been described, the present techniques may also be used in communications at even higher frequencies than those described herein.

In view of the aforementioned space constraints within electronic devices, the present techniques enable space sharing opportunities between antennas and other subsystems, including dual-use of structural components of the electronic device as partial or complete antenna implementations. For example, antenna integration into internal shield structures, electronic subsystems, or near user input devices represents a dual use of device volume that can enable additional radio features without physical device growth. The present techniques thereby enable delivering a required or desired radio functionality through the dual use of space within a device, where antennas, and particularly higher frequency antennas, can share device volume with other essential device features.

The present techniques may apply to a plethora of device form factors, from phones, to phablets, to tablets, foldable devices, to laptops, other 2-in-one devices, all the way up to large screen topologies that may elect to integrate high frequency radio technologies. High frequency radio technologies include 5G mmWave communications within the 24-40 GHz frequency range as well as 60 GHz and beyond, such as radio solutions near 340 GHz. For example, high frequency communications, as used herein may refer to 5G mmWave communications, Institute of Electrical and Electronics Engineers (IEEE) 802.11ad communications, and beyond. The use of higher frequency radios enables an increase in data-rate throughputs, a reduction in latency, and an improvement in spectral efficiency which enables more users on the frequency band.

Figure 10:
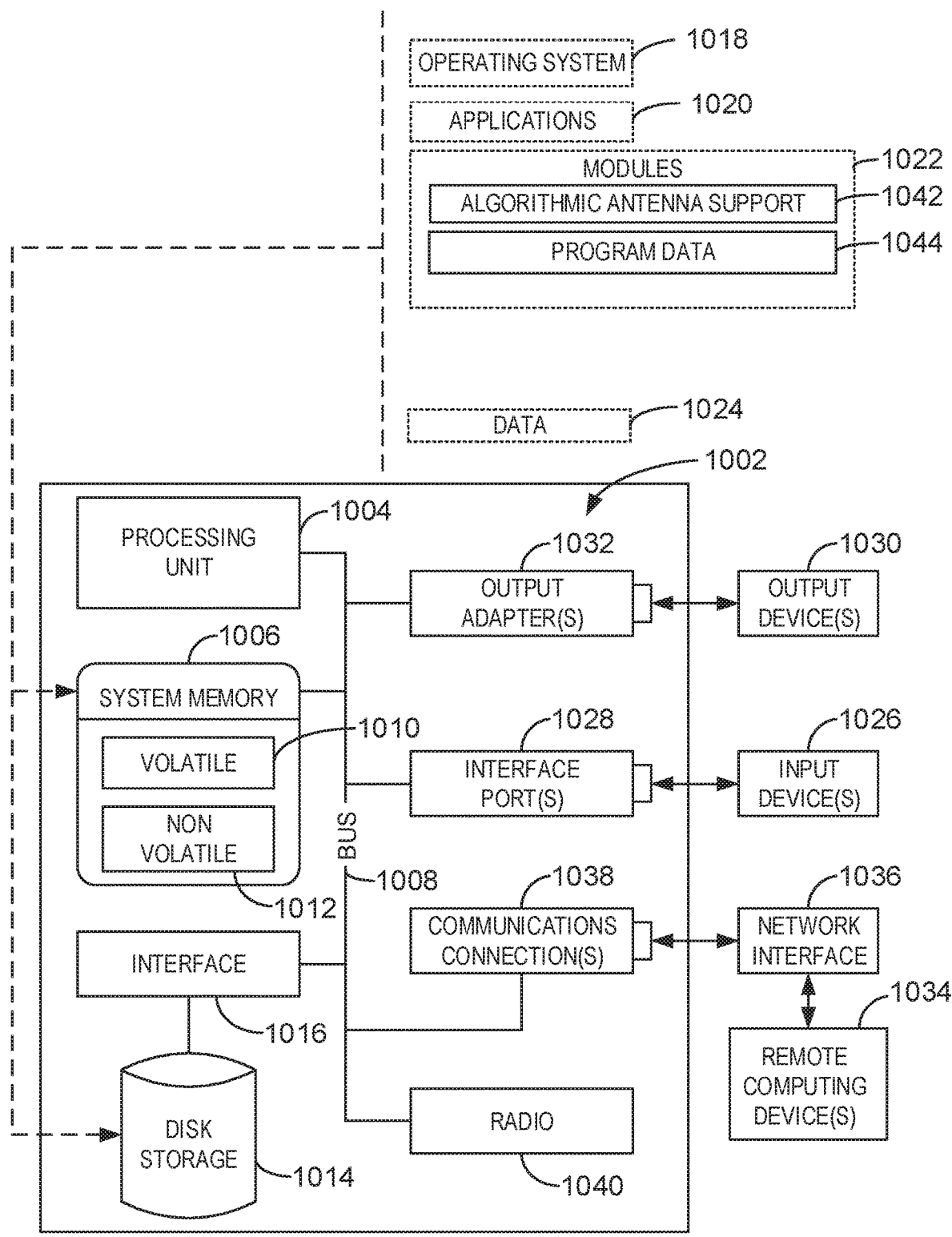
FIG. 10 is a block diagram of an example of a computing system that includes high frequency antenna integration.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 10 discussed below, provides details regarding different systems that may be used to implement the functions shown in the figures.

Other figures may describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, medium, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like. The communication media may include cables, such as fiber optic cables, coaxial cables, twisted-pair cables, and the like. Moreover, transmission media for wireless signals may include hardware that enables the transmission of wireless signals such as broadcast radio waves, cellular radio waves, microwaves, and infrared signals. In some cases, the transmission media for wireless signals is a component of a physical layer of a networking stack of an electronic device.

FIG. 1A is a cross section of an electronic device 100A. The electronic device includes a display glass 102 and a rear panel 104. The display glass 102 and the rear panel may be coupled to form a housing 106 of the electronic device 100A. Within the housing 106, a display panel 108 is located immediately adjacent to the display glass 102. Touch traces form a grid that overlays the display panel 108 to enable touch screen functionality of the electronic device 100A. The touch traces 110 may terminate in a bezel region 112 of the electronic device 100A. While touch traces 110 are illustrated in the bezel region 112 of the electronic device 100A, other circuitry may be present in the bezel region and have some legitimate purpose for being in the bezel region 112 of the device. However, the touch circuitry or other circuitry located in the bezel region of the electronic device 100A does not make use of the entire bezel region 112 surrounding the display panel 108. In embodiments, the touch traces 110 may occupy a portion of the bezel region 112. The portion of the bezel region 112 used according to the present techniques may be the portion not occupied by touch traces 110 or other circuitry located in the bezel region 112.

The housing 106 also includes a printed circuit board (PCB) 114. The printed circuit board 114 may be located near the rear panel 104. Traditionally, within an electronic device a circuit device such as the PCB 114 is located at the rear of the device. Further, the side walls, such as side wall 116 are a metal structure. In embodiments, the side wall 116 is plastic, ceramic, or non-metallic. An antenna 118 may be positioned within the housing 106, and includes a connector 120, an arm 122, and a substrate 124. The antenna 118 may be disposed in an area that begins at the PCB 114 where the connector 120 is coupled with the PCB 114. In embodiments, the PCB 114 may be offset from the rear of the device by some number of millimeters. The connector 120 of the antenna is also coupled with an arm 122 that ends in a substrate 124. The arm 122 and the substrate 124 may be flexible and contain one or more traces that enable antenna functionality. The antenna 118 may be a flexible printed circuit (FPC) antenna. The radio circuitry, such as a high frequency millimeter wave radio chip, can be mounted directly on the FPC. The antenna 118 may be a multilayer FPC antenna, with a plurality of flexible conductive layers and a plurality of flexible insulating layers. Plated through-holes (PTH) may form connections between the layers of a multilayer FPC antenna.

The antenna 118 may be bent or otherwise configured to conform to one or more corners. As illustrated, the antenna 118 is bent in two locations along the rear panel 104 and side wall 116 of the housing 106. This flexibility of the antenna 118 enables a position in a corner of the device 100A, where the antenna can be positioned along or near three sides of the housing 106. In particular, the antenna 118 can interface with the PCB 114 located at the bottom of the device 100A near the read panel 104. The arm 122 of the antenna 118 can bend to conform to the corners created by (1) the rear panel 104 and the side wall 106 and (2) the display glass 102 and the side wall 106.

For high frequency radio circuitry, such as mmWave circuitry, techniques that may be standard practice for lower frequency designs (such as WiFi & LTE) can represent excessive parasitic inductance, capacitance, or loss in high frequency applications. Examples of these techniques include pogo pin or spring finger interface connections between radio boards and antenna elements (the geometry of such objects is often a significant fraction of a wavelength). Excess trace lengths and the very short wavelengths in high frequency communications also represent excessive signal loss. As a result, high frequency radio front-end chips are typically located very close to the antenna elements, with an interface path that eliminates the majority of parasitic artifacts. As used herein, the distance between the high frequency radio front-end chips and the antenna elements may be a distance that reduces signal loss to no more than a maximum recoverable signal loss based on the wavelength of the signals.

Radio chips are typically implemented as bare die or bumped die to eliminate package parasitic inductance. This results in the radio chip being placed on a planar substrate.

In traditional implementations, antenna feed traces, such as a microstrip, stripline, and the like, commence at the chip pins and should be routed to antenna elements with a minimum number of parasitic artifacts. Traditional black box approaches locally include the antenna elements as part of the radio frequency (RF) module, but this approach prevents antenna integration and imposes constraints on internal device volume usage. The traditional black-box approaches also place constraints on industrial design (ID) intent that results in wider than desired bezels. The present techniques utilize different device features as part of the high frequency antenna design to eliminate the constraints found in traditional antenna design.

Furthermore, high frequency antenna implementations enable additional antenna fabrication options. Traditionally, printing conductors on glass or combining touch and antenna circuits has not been considered a desirable design option. This is due to, in part, the need for relatively thick trace metal required to minimize conductor losses experienced with lower frequency implementations, such as LTE. Traditionally, a metal thicknesses of the order of 15 micrometer (μm) is desired while the plating process capability has been typically constrained to the sub-5 μm range. As high frequency antenna implementations are considered, the plating process capability easily meets design needs with respect to conductor losses. Thus, in embodiments, antenna elements may be printed on glass or combined with touch circuitry.

While a single connector 120, arm 122, and substrate 124 are illustrated, the antenna 118 may include an antenna array. The antenna array may be fed by multiple radio transmit and receive ports to enable link scenarios with signal frequencies spanning the sub-100 GHz frequency range. The antenna array elements can be situated on the flexible substrate of the FPC to enable RF radiation through the RF transparent display glass 102. In embodiments, the rear panel 104 may be an RF transparent material such as plastic, glass, ceramic, and the like. In such embodiments, antenna elements can be positioned to radiate through the side wall 116. In this manner, an antenna array can have antenna elements positioned in orthogonal planes of the device. Placing antenna elements in orthogonal planes can result in antenna elements that are geometrically opposed, resulting in multiple phases. Beam forming can then be performed using two orbital planes. The electronic device 100A may also include two independent antenna arrays located in the bezel region 112, where a first antenna array is configured to face out of the side wall 116 and a second antenna array is configured to face out of the display glass 102. An algorithm may enable switching between the first antenna array and the second antenna array as needed to optimize RF link performance.

Figure 1B:
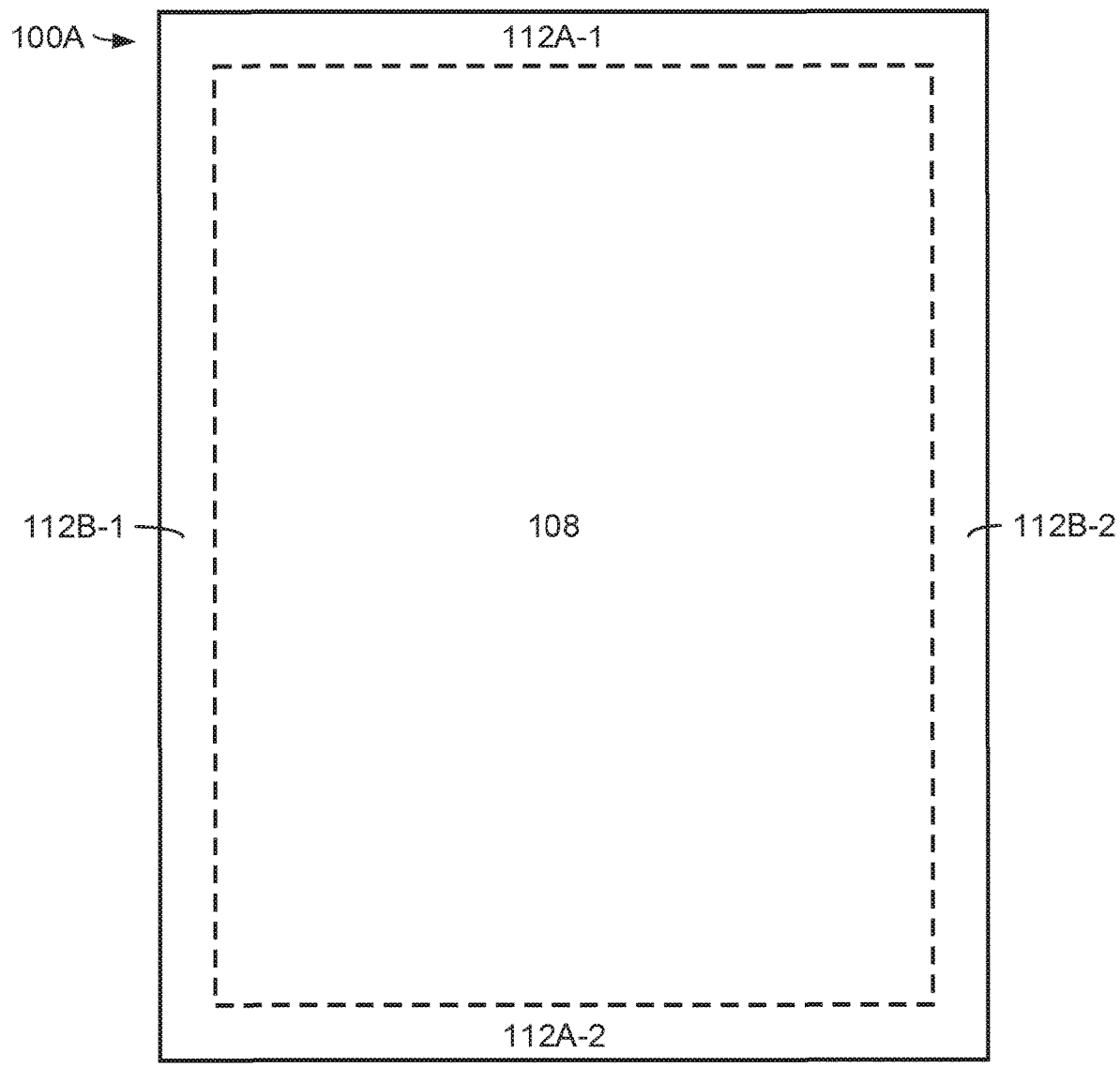
FIG. 1B illustrates a front view of an electronic device.

For ease of description, the present techniques illustrate the antenna in a single bezel region of the device. However, antenna elements can be mounted on all edges of the display panel. For example, FIG. 1B illustrates a front view 100B of an electronic device 100A. The front view 100B includes a display panel 108 covered by a display glass, not illustrated in FIG. 100B. The display glass extends to each edge of the device 100A. Surrounding the display panel 108 is a bezel region 112, that includes horizontal bezel region 112A-1 and 112A-2 and vertical bezel region 112B-1 and 112B-2. The antenna elements can be created on the vertical edges 112B-1 and 112B-2 and on the horizontal edge 112A-1 and 112A-2. Thus, in FIG. 1A, the cross section represents the interior of the electronic device 100A, where the cross-section view includes any bezel region 112A-1, 112A-2, 112B-1, or 112B-2 as illustrated in FIG. 1B.

FIG. 2 is a cross section of an electronic device 200. The electronic device 200 includes a display glass 202 and a rear panel 204. The display glass 202 and the rear panel may be coupled to form a housing 206 of the electronic device 200. Within the housing 206, a display panel 208 is located immediately adjacent to the display glass 202. Similar to FIG. 1, touch traces 210 form a grid that overlays the display panel 208 to enable touch screen functionality of the electronic device 200. The housing 206 also includes a printed circuit board (PCB) 214. The printed circuit board 214 may be located near the rear panel 204. As illustrated, the PCB 214 spans essentially the entire width of the rear of the electronic device 200. Similar to FIG. 1, an antenna 218 may be positioned within the housing 206. The antenna 218 may be coupled to the PCB 214 via an interface 220.

The antenna 218 may be a low-temperature cofired ceramics (LTCC) antenna that can include antenna array elements and RF front end circuitry. In particular, antenna array elements can be situated on the ceramic of the antenna 218 to enable RF radiation. The LTCC antenna may be a multilayer LTCC antenna. In the illustration of FIG. 2, the antenna is positioned to enable the transmission of radio waves through the RF transparent display glass. In embodiments, the rear panel 204 may be fabricated from an RF transparent material such as plastic, glass, ceramic, and the like, and antenna elements are positioned to radiate through the side wall 216. In this manner, the antenna array 218 can have elements positions on orthogonal planes (vertical and horizontal). Placing antenna elements in orthogonal planes can result in antenna elements that are geometrically opposed, resulting in multiple phases. Beam forming can then be performed using two orbital planes. The electronic device 200 may also include two independent antenna arrays located in the bezel region 212, where a first antenna array is configured to face out of the side wall 216 and a second antenna array is configured to face out of the display glass 202. An algorithm may enable switching between the first antenna array and the second antenna array as needed to optimize RF link performance.

In FIG. 2, the illustrated space available to dispose the antenna 218 includes enough height to enable printing of the antenna as an option for fabrication. The height of the space available can be indicated by the length of the side wall 216 combined with the height of the display glass. As discussed above, fabrication via printing requires a greater material thickness when compared to fabrication according to a plating process. This increase in thickness due to fabrication techniques makes a larger volume of space need to house the antenna. Since there is ample space available along the edge of the device, an LTCC circuit may be fabricated by a printing process.

The interface 220 may be a connector where at least a portion of the connector is soldered to the LTCC block of antenna 218 and another portion is soldered to the PCB 214. The interface may be coupled with the LTCC block of antenna 218 and the PCB 214 via a mechanical retention mechanism that enables the components to snap together. In other embodiments, the interface may be coupled with the LTCC block of antenna 218 and the PCB 214 via a spring interface mechanism.

For ease of description, FIG. 1A illustrates a flexible antenna such as an FPC antenna, and FIG. 2 illustrates a block antenna such as the LTCC antenna. However, in embodiments, the antenna 118 of FIG. 1A and the antenna 218 of FIG. 2 may be a combination of LTCC and FPC antennas. For example, an LTCC block may be coupled with an FPC to enable antenna functionality. In embodiments, anisotropic conductive film (ACF) folding may be used to couple an LTCC block with an FPC to realize antenna functionality. Accordingly, the present techniques enable very precise control over the relative positions of the geometry for each antenna.

As used herein, an antenna element may refer to the driven element, active element, or radiating element of the antenna. With high frequency antennas, one single antenna element may not be sufficient for data transmission or reception. Accordingly, the antenna may include a plurality of antenna elements to form an antenna array. For ease of illustration, the antenna 118 (FIG. 1A) and the antenna 218 (FIG. 2) have been illustrated as a single antenna element. However, the antenna 118 (FIG. 1A) and the antenna 218 (FIG. 2) may include multiple antenna elements for form a single antenna array. Moreover, the antenna 118 (FIG. 1A) and the antenna 218 (FIG. 2) may also include a first set of antenna elements to form a first antenna array, and a second set of antenna elements to form a second antenna array. As described above, the first antenna array may be positioned to face a first plane, and the second antenna array may be positioned to face a second plane, where the two planes are orthogonal.

An antenna array may include antenna elements according to any antenna topology, including a slot antenna. A slot antenna may be formed on a flat surface with a slot cut out the surface, such that the slot is surrounded on all sides by the slot material. The surface may be conductive, such as a metal plate. When conductive surface is excited by an RF current from a transmitter, radio waves may be produced. The surface can also receive incoming radio waves and covert those radio waves to an RF current that is supplied to a receiver. A surface can have a plurality of slots, where each slot of the plurality of slots forms an antenna element. The size and shape of the slot may affect the gain and directivity of each antenna element. The gain of an antenna describes a performance ability of the antenna in converting electrical signals to radio waves and converting radio waves to electrical signals. The directivity the antenna refers to the degree which radio waves are emitted in a single direction.

FIG. 3 is an illustration of three slot antenna configurations 300. Each configuration 300 illustrates a housing 302, a housing 304, and a housing 306. Each housing represents a portion of a device such as an electronic device. The housing 302 includes a region of metallization 312. The housing 304 includes a region of metallization 314. The housing 306 includes a region of metallization 316. For each housing 302, 304, and 306, a different configuration of the slot elements in the metallization is illustrated.

The different configurations 300 of the slot elements can enable various different antenna radiation properties. In particular, the configurations 300 may achieve differing gains and directivity based on the relative positions of the slot apertures in the region of metallization to form antenna array elements. The region of metallization 312 includes apertures 320A, 320B, 320C, and 320D. The region of metallization 314 includes apertures 322A, 322B, 322C, and 322D. The region of metallization 316 includes apertures 324A, 324B, 324C, and 324D. Each aperture is illustrated in a region of metallization. Thus, for each housing there are four antenna elements in a metallic region that are to be driven as an antenna element.

Each region of metallization can be, for example, printed directly onto a structure of the device or affixed to a structure of the device if fabricated separately. For example, each region of metallization can be printed or affixed to the bezel region of the display glass in a device. In another example, each region of metallization can be printed or affixed a portion of a housing that is radio frequency (RF) transparent, with the slots facing out of the device through the RF transparent material. RF transparent material includes, but is not limited to, plastic, ceramic, glass, or any combination thereof. The placement of the metalized slot region is not limited to the bezel region of a device, and can be positioned in various places throughout the device.

In some cases, the slot antenna elements illustrated in FIG. 3 are parasitically fed slot antenna elements configured as an array on part of a device enclosure made of an RF transparent material. In the configurations 300, the slot elements can be excited by conductive feed structures built into an RF module that is accurately aligned over the slot apertures to complete the implementation of the antenna elements. The use of multilayer RF circuit techniques, with the possibility of layers of different thickness and different dielectric properties, can provide additional degrees of freedom to optimally excite the slot antenna elements. The RF substrate material can be made of material that is thermally compatible with the material on which the slots are printed. For example, a ceramic RF substrate will have a similar or compatible coefficient of thermal expansion to a ceramic housing material, ensuring that these items do not crack or break over time with thermal expansion/contraction effects arising from normal device use.

In embodiments, a slot antenna may be combined with antenna elements implemented directly in an adjacent RF module. For example, the slot array could be augmented by dipoles, loops, or patches implemented in the RF module itself, delivering even greater control over array directionality and steering. Moreover, each aperture of a slot antenna may be configured to enable independent antennas in a single region of metallization. In such a scenario, the apertures can be placed at differing positions relative to other apertures in the region of metallization. In configuration 304, the region of metallization at 314 illustrates apertures 322A and 322D positioned at an angle when compared to apertures 322B and 322C. This configuration which would yield a different beam-forming outcome when compared with the region of metallization at 312 of configuration 302, where the apertures 320A, 320B, 320C, and 320D are positioned with the length of an aperture substantially parallel to the length of another aperture, and approximately the same distance between each aperture. Similarly, the region of metallization at 316 of configuration 306 will result in another beamforming outcome when compared to configurations 302 and 304.

Accordingly, the present techniques enable dual-use of a device housing, where the housing can be used for a first purpose, such as support or shielding within the internal space of the device. A second purpose is that of an antenna, where strategically designed apertures located in regions of metallization enable beamforming of the antenna elements to be precisely designed and fine-tuned based on the particular construction of the electronic device. Each aperture may be an independent slot antenna, and can be implemented as a multilayer structure that is fed from a direct feed microstrip or a coupled microstrip line from a different layer below it deep in an FPC structure. The radio chip may for each aperture may be located near each aperture.

Figure 4:
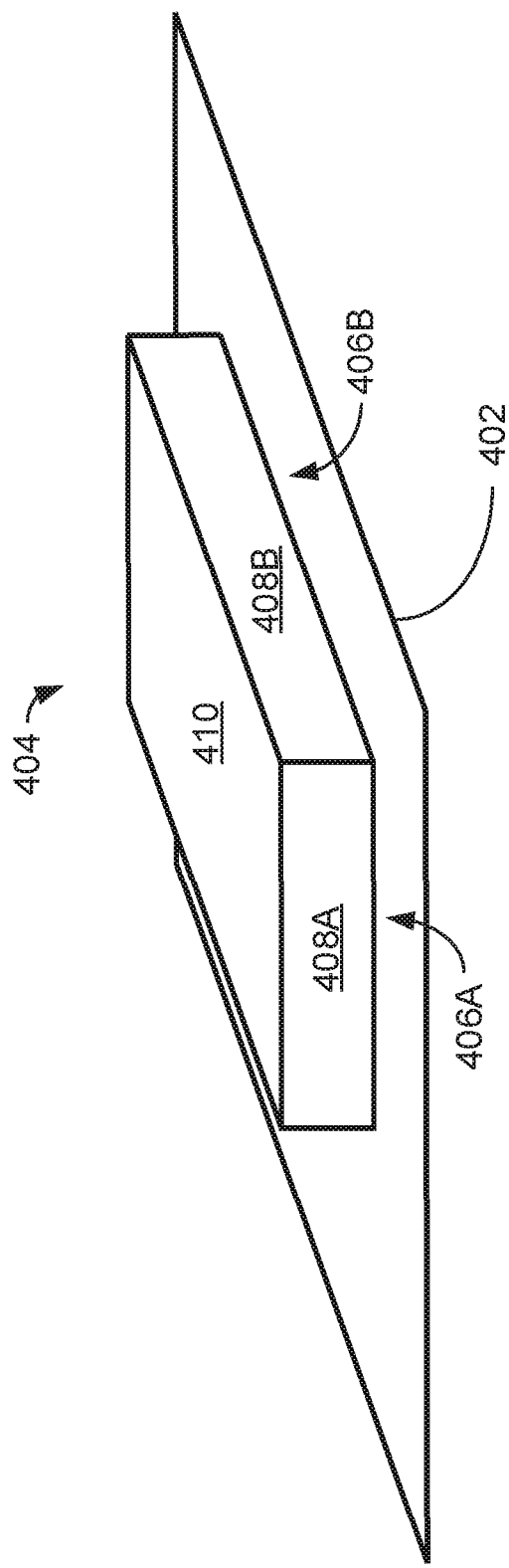
FIG. 4 is a device with a PCB and a shield can.

FIG. 4 is a device 400 with a PCB 402 and a shield can 404. The shield can 404 is attached to the PCB 402 via the visible edges 406A and 406B via a conductive means, such as solder. The shield can 404 also includes visible shield can faces 408A and 408B. Further, the shield can 404 includes shield can top 410. In embodiments, the shield can 404 of FIG. 4 can be configured as a slot antenna. In particular, any side of the shield can may function as a surface suitable for an aperture to enable a slot receiver.

Shield cans, such as the shield can 404, are typically conductive structures that are three-dimensional black boxes mounted directly to a printed circuit board. The shield can is to shield electromagnetically noisy devices within a device that are otherwise cause radio performance degradation for low frequency radios. Thus, shield cans enable low frequency radios, such as radios used in WiFi, LTE, global positioning system (GPS), communications, to operate within a device enclosure without interference from other devices that leak excess electromagnetic radiation.

By contrast, mmWave devices operate at a much higher frequency when compared to low frequency radios, such as WiFi, LTE, GPS, and the like. Electromagnetically noisy devices tend to release excess electromagnetic radiation within an internal device volume, such as memory chips and central processing units (CPUs). These devices typically do not generate noise in the frequency range of 24 GHz to 40 GHz, or even beyond. Thus, a high frequency radio can coexist near most low frequency components, without interference by noise from those low frequency sources. Accordingly, a shield can that is designed to mitigate the propagation of low frequencies throughout an electronic device housing can be repurposed with a dual use to act as an antenna for high frequency applications. As used herein, high frequency refers to a frequency within a frequency range with a low end that begins at approximately 24 GHz. A low frequency refers to a frequency that is lower than 24 GHz. A high frequency may also be defined by the technology which is enabled by the frequency range, such as mmWave communications, 5G networks, 6G networks, and so on. Similarly, a low frequency may also be defined by the technology which is enabled by the frequency range, such as WiFi and LTE.

Figure 5:
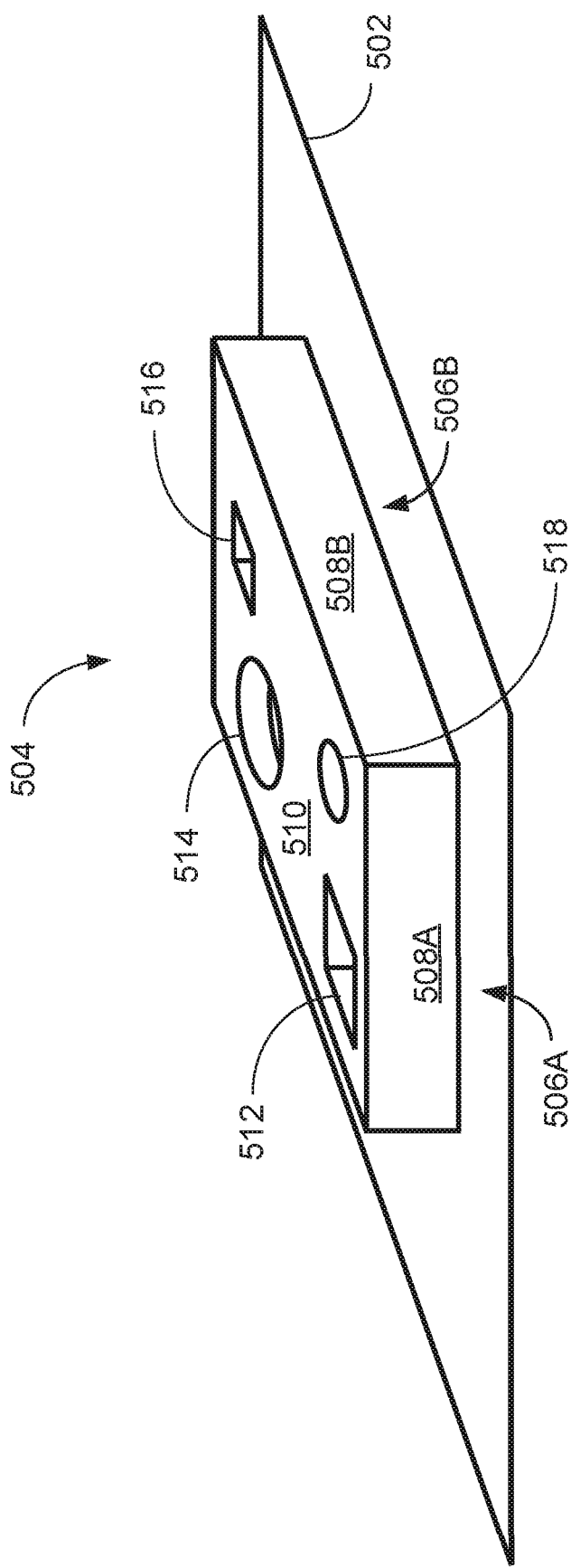
FIG. 5 is a device with a PCB and a shield can.

FIG. 5 is a device 500 with a PCB 502 and a shield can 504. As illustrated, the shield can 504 is attached to the PCB 502 via edges using a conductive means, such as solder. The edges include the visible edges 506A and 506B. The shield can 504 also includes visible shield can faces 508A and 508B. The shield can 504 also includes shield can top face 510. The shield can 504 includes apertures 512, 514, 516, and 518 in the shield can top face 510. Each aperture can function as a slot antenna.

The plurality of apertures 512, 514, 516, and 518 may form an array of antenna elements for a single antenna, often used in mmWave communications. The plurality of apertures 512, 514, 516, and 518 may also form four independent antennas. Beneath the shield can 504 a cavity (not illustrated), is surrounded by the top face 510 five other faces 408. Two faces 508A and 508B are illustrated in FIG. 5. The faces 508A and 508B may be formed of conductive material and electrically coupled to top face 510. Within the cavity, circuitry may be disposed to electrically couple the slot antenna to the PCB 502. In this manner, the shield can 504 may be configured to receive RF current from a transmitter of an RF module to drive the antenna or antenna elements created by the apertures 512, 514, 516, and 518.

As illustrated in FIG. 5, the apertures 512, 514, 516, and 518 on the top face 510 can be of any shape and size. Thus, while the apertures are referred to as "slots," they need not be rectangular. Various aperture shapes (circular, oval, square, rectangular) are illustrated, however, the size and shape of each aperture 512, 514, 516, and 518 may be set according to a particular antenna design. In particular, the slot geometry and size along with the geometry and size of the cavity can be adjusted to set a bandwidth and a resonance of the antenna in embodiments, each aperture 512, 514, 516, and 518 is an opening (cut out of the conductive material) that can be positioned, in both relative placement and geometry, to form part of an antenna array. Configurations that are not part of an array are also possible.

While apertures 512, 514, 516, and 518 are illustrated on the top face 510, the apertures may also be placed on all vertical shield can faces, such as shield can faces 508A and 508B. Thus, combinations of antenna apertures can be used on one or more faces of the shield can. In embodiments, apertures 512, 514, 516, and 518 can be electrically coupled or combined with additional elements on one or more vertical shield can faces 508A and 508B. Antenna element position and geometry can be optimized as part of an array, to maximize angular beam steering, or to optimize fundamental polar patterns.

Each aperture 512, 514, 516, and 518 can be driven individually as an antenna element. However, an aperture can be coupled with an FPC antenna that is underneath the aperture, such that the FPC antenna is positioned to transmit and receive information through the aperture. While a single aperture is described, a single shield can may have multiple apertures with an FPC antenna disposed near each aperture, thereby creating an antenna array along the shield can. With apertures in the shield can, any low frequency radio interference resulting from the apertures can be avoided by creating a seal using grounding structures present on typical FPC antennas. For example, if an aperture or opening in the shield can is large enough to allow egress of low frequency noise when not mitigated, a multilayer FPC can be positioned to cover the aperture. The antenna element on the FPC can transmit or receive signals through the aperture. Moreover, a continuous ground plane\sheet on a lower layer of the FPC can be connected to a ground ring on the top layer of the FPC (the ground ring and the antenna element can be on the same layer). Vias in the FPC can be used to connect the ground layer to the ground ring. The ground ring does not intrude into the aperture and is deliberately dimensioned to ensure that the ground ring can make contact with the shield metal. In this manner, the aperture in the shield is covered with a grounded structure, effectively closing the hole in the shield for lower frequencies, while an antenna element can use the opening to accommodate intentional high RF radiation or reception.

Figure 6:
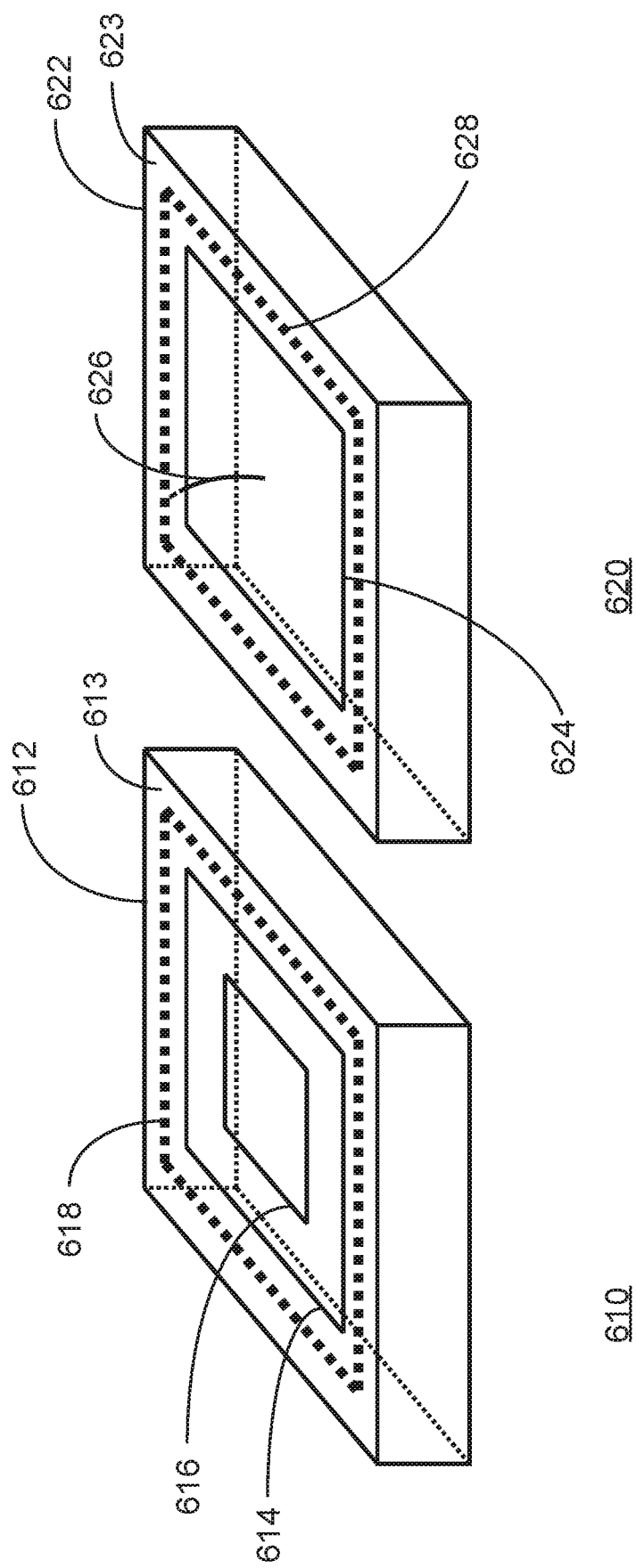
FIG. 6 is an internal view of shield cans.

FIG. 6 is an internal view of shield cans 610 and 620. For ease of description, a single aperture 614, 624 is illustrated on each shield can 610, shield can 620, respectively. However, the present techniques can apply to a plurality of apertures and antenna elements, on one or more faces of the shield can structure. Moreover, the present techniques can apply to a plurality of antenna elements configured in a single antenna array, or a plurality of antennas formed from a number of apertures. The shield can 610 includes a conductive surface 612. The conductive surface 612 includes a top face 613, where an aperture 614 is formed in the top face 613. The conductive material of the conductive surface 612 may be metal. Beneath the conductive surface 612, within a cavity created by the shield can 610, a patch antenna element 616 may be coupled with one or more feeds and is fully exposed within the aperture 614. An antenna substrate may support the patch antenna element 616 within or near the aperture 614. The antenna substrate may be coupled with the side of the top face 613 within a cavity formed by the conductive surface 612. In other words, the antenna substrate may be coupled with a back side of the top face 613. The antenna substrate can include several layers, with at least one layer being a grounding ring 618. The patch antenna element 616 may be a flat rectangular sheet or patch of conductive material, mounted over the antenna substrate include the grounding ring 618. The antenna substrate including the grounding ring 618 can be a multilayer FPC circuit or a multi-chip module structure made of ceramic, such as an LTCC circuit. In either case, the antenna substrate can host antenna elements, antenna feed structures, and RF front-end circuitry such as gain shifters, phase shifters, and, in the case of an array of elements, low noise amplifiers and the like.

As used herein, a cavity refers to the three-dimensional volume enclosed by a substrate, such as a PCB and the shield can. The cavity may include any number of electromagnetically noisy components, and the PCB and shield can are configured to confine the excess radiation from these noisy components within the cavity. Further, the aperture as an opening in one or more faces of the shield can, and can be distinguished from the volume of the shield can. In embodiments, the aperture 614 is effectively "closed" with respect to low frequency leakage through placement of the substrate with the grounding ring 618. In other words, the aperture 614 may be sealed (thereby preventing the leakage of low frequency radiation) by a grounding feature of the antenna substrate, including the grounding ring 618, such that no low frequency radiation escapes the shield can 610. The grounding ring 618 of the antenna substrate may be placed in direct electrical contact with the top face 613 of the shield can 610 that forms aperture 614. Thus, the substrate and associated grounding ring 618 is located within the cavity created by the shield can conductive surface 612 and a PCB. The grounding ring 618 of the antenna substrate represents a continuous ground structure that extends around the aperture 614. The ground structure forms a grounding ring 618 in the antenna substrate that surrounds the aperture 614, but does not intrude into the opening created by the aperture 614.

The antenna substrate may consist of has multiple layers, in addition to the grounding ring 618 that is illustrated in FIG. 6. One layer may be a continuous layer of ground in the antenna substrate. Alternatively, a layer of ground in the antenna substrate may be formed to be the same size as the aperture 614. The ground layer is connected to the ground ring 618. When the ground ring contacts the shield can conductive surface, it has effectively closed the opening in the shield to low frequency leakage, and the noise that exists in the shield can volume is trapped within the closed volume or cavity formed by the shield can conductive surface 612 and the antenna substrate with which the shield can is electrically coupled. The ground ring 618 can be coupled to the shield can via conductive epoxy and conductive pressure sensitive adhesive (PSA).

For ease of description, the shield cans 610 and 620 are not illustrated with the typical contents of a shield can that are wholly unrelated to the antenna additions described. Each of shield can 610 and 620 are mounted onto a PCB substrate (not illustrated) and components are attached to the PCB. These components may be noisy components (at relatively low frequencies) that are shielded by the shield cans 610 and 620. The antenna substrate, including ground ring 618, is added to a device volume that includes the shield can and low frequency, noisy components. This yields a shield structure that contains leakage from potentially noisy low frequency components while functioning as a high frequency antenna (an FPC antenna, LTCC antenna, or any combination thereof). The antenna radiation is enabled by the shield can with at least one aperture. The techniques described herein preserve the shielding effectiveness of the shielding cans 610 and 620.

Similar to shield can 610, the shield can 620 includes a conductive surface 622. The conductive surface 622 includes a top face 623, where an aperture 624 is formed in the top face 623. A stripline 626 couples the aperture 624 with an antenna substrate the includes a grounding ring 628. In the example of the shield can 620, the shield can aperture (e.g. a slot) is parasitically fed by an antenna feed structure and trace 626 that is housed on the antenna substrate that includes the grounding ring 628 within the shield can 620. The antenna substrate including the grounding ring 628 can host antenna elements, antenna feed structures, and RF front-end circuitry such as gain shifters, phase shifters, and, in the case of an array of elements, low noise amplifiers and the like. Energy may be delivered to the conductive surface 622 through the stripline 626. The stripline 626 includes a central conductor, also referred to as a feed, to excite an electric field across a slot in the conductive surface. The end of stripline 626 may be attached to an RF connector on the antenna substrate including grounding ring 628 for connecting to radio circuitry.

Grounding rings 618 and 628 are illustrated as components of their respective substrate that are placed near a single aperture, where each respective aperture forms a single antenna element. However, the single element is for descriptive purposes only, and a shield may include several elements in a single shield can. The antenna substrates including grounding rings 618 and 628 may include grounding circuitry, which can be affixed directly around the aperture with conductive adhesive or conductive PSA around the aperture of the shield can. Thus, each aperture is surrounded by a grounding perimeter. In embodiments, a shield can with four apertures is driven by four discrete regions of an FPC. Each region may be joined together by an interconnecting branch of an FPC. The interconnecting branch could then be coupled with the antenna substrate.

Figure 7:
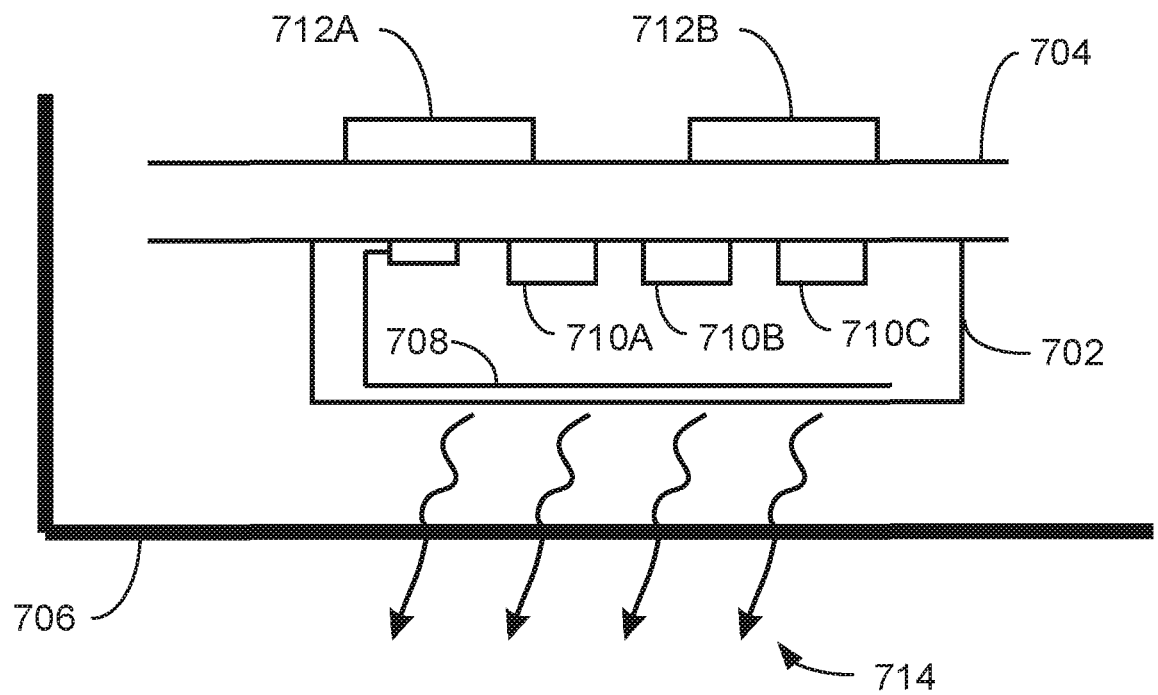
FIG. 7 is a cross section of a device illustrating deployment of the shield can antenna structure.

FIG. 7 is a cross section of a device 700 illustrating deployment of the shield can 702 antenna structure. The shield can 702 may be a shield can 404, 500, 610, or 620. The shield can 702 may have one or more apertures, not illustrated in the top view of FIG. 7. The shield can 702 may be coupled with a PCB 704, which can be housed within the device 700 that includes a non-conductive rear panel 706 of the device. The non-conductive rear panel 704 is RF transparent, and can be made of RF transparent materials such as ceramic, glass, or plastic. The shield can 702 is attached to a PCB substrate 704 within the device 700. An RF FPC (or ceramic module) antenna 708 is illustrated exciting emissions 714 from apertures in one face of the shield can 702. The RF emissions are illustrated as black radiating lines 714 through the rear case of the device.

The non-conductive rear case of the device becomes a random of the antenna 708 and should be non-metallic to enable wave transmission. In FIG. 7, transmission of radio waves out of the rear panel 706 requires a non-conductive material. Accordingly, the rear panel 706 of the device may be made from glass, ceramic, plastic, and the like.

Note that electrical or RF circuitry 710A, 710B, 710C, 712A and 712B are illustrated on both sides of the PCB 704. In particular, circuitry 710A, 710B, and 710C are located within the shield can 702. Circuitry 712A and 712B are located outside of the shield can 702, and the opposite side of the PCB 704. These circuits are not required to be associated with the RF/antenna circuitry. The potentially noisy circuitry 710A, 710B, 710C, can require the presence of the shield can 702 to enable the device to meet regulatory emissions requirements, such as Federal Communications Commission (FCC) Part 15 emissions testing. Radios operating at a high frequency will not experience interference from these the much lower frequency circuits, such as 710A, 710B, 710C. In this manner, the shield can 702 enables a dual use of space in the electronic device. This dual use is achieved with little or no increase in the thickness of the device.

A device may include multiple shield cans for shielding electrical circuitry. More than one antenna array could be implemented in one or more shield cans within a device. In the example of FIG. 7, radiating elements face out of the RF transparent bottom of the device. When the shield can is close to an RF transparent side wall of a device, the side walls of the shield can that face towards the outside of the device could also be used to accommodate antenna array elements. This can offer different polar pattern options.

Thus, FIG. 7 is an illustration of a device where the non-conductive rear case is RF transparent without any degradation of the RF shield can. There are two categories of circuits within or underneath the shield can—the low frequency circuitry that is intended to be shielded from release outside the shield can, and the high frequency antenna circuitry that can be in the form of arrays to drive the shield can in a high frequency antenna functionality. The thickness of the circuitry used to achieve high frequency functionality may be a few fractions of a millimeter thick. For example, FPCs are often 0.2 and 0.3 millimeters thick. As a result, the antenna elements would impose no greater thickness impact on the device design than what would be normal a multilayer FPC. Note that the height of the shield can is low, such that it is too low to support low-frequency antennas. In other words, there is not enough height available underneath the shield to provide adequate height above the ground plane required by low frequency communications. Moreover, the use of a shield can as a low frequency antenna may not operate due to the amount of noise generated by the other circuits resulting in degraded low frequency signals. Since millimeter wave communications operate at such a high frequency, the shield can re-purposed as a high frequency antenna will function as required without interference.

Accordingly, the present techniques apply to any frequency that is high enough to be immune from the noise that is to be blocked by the shield can and where an adequate height exists under the shield can to accommodate the necessary height above the ground plane. The present techniques enable functionality of the shield can for shielding effectiveness at low frequencies while enabling use of the space underneath the shield can that is generally wasted, inaccessible internal device volume. Furthermore, the present techniques eliminate the need for dedicated space for the addition of extra radios. The elimination of dedicated space also eliminates any possible increase in the size of the device due to additional radios.

The shield can as described herein may be an internal structure of an electronic device. Other internal structures include, but are not limited to, a trackpad. Generally, an internal structure of a housing may be a frame or device located within the housing of the electronic device. The frame, for example, may be a portion of the housing. This portion of the housing may include clips, screw holes, fasteners, or other mounting features to secure a plurality of electronic components within the housing. In embodiments, high frequency antennas may be placed nearby or integrated into the internal structure. In some cases, the internal structure may operate at a low frequency or may be considered a low frequency component. Additionally, the internal structure may be configured to mitigate, shield, or otherwise reduce low frequency noise within the electronic device.

Figure 8:
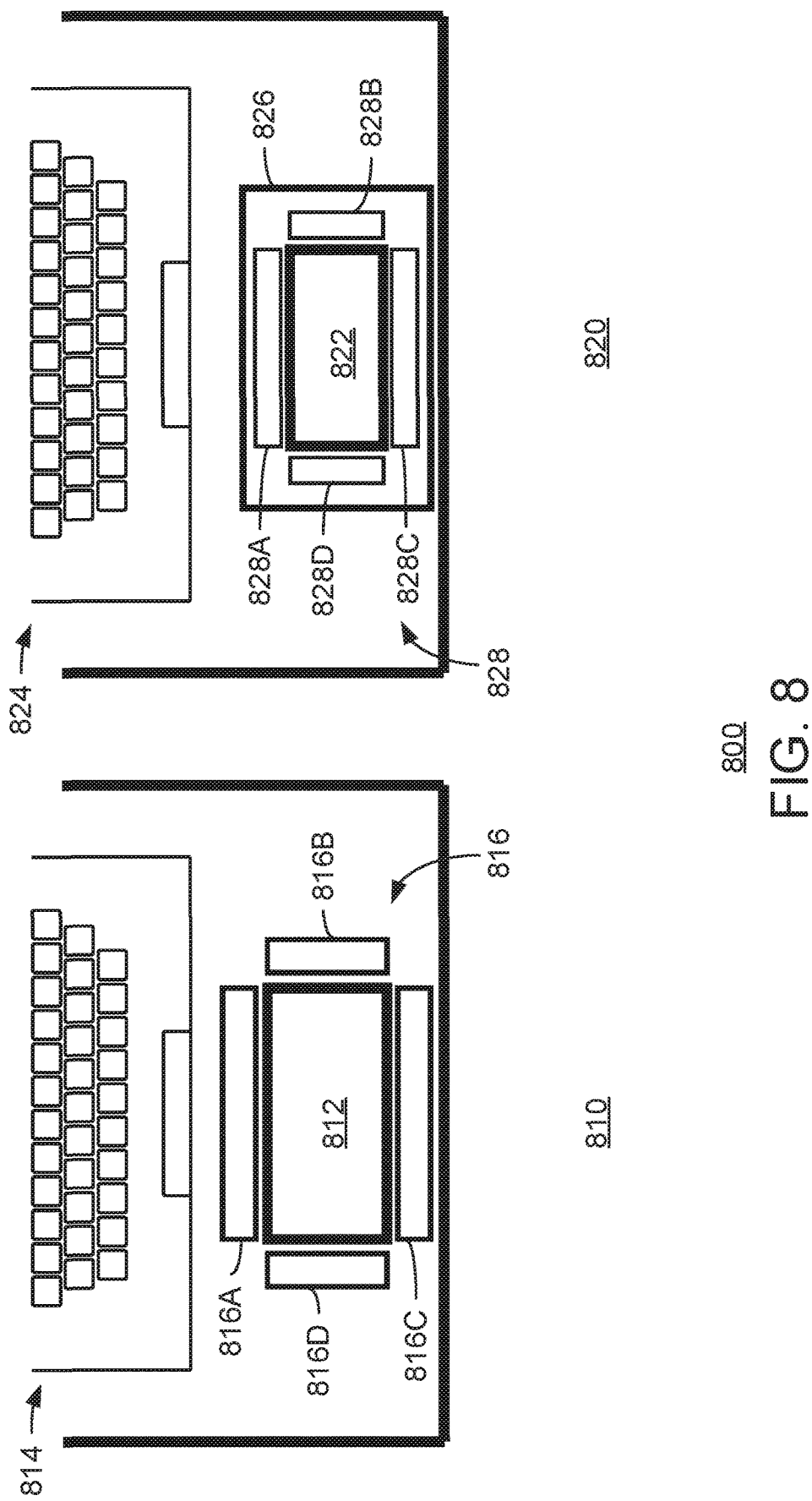
FIG. 8 is an illustration of a keyboard and trackpad housings.

FIG. 8 is an illustration of a keyboard and trackpad housings 800. While the present techniques are described using a trackpad, the present techniques may apply to any input device such as a touchpad, glide pad, click pad, click wheel, and the like. The housings 800 a base of a laptop, or on the removable keyboard accessory of a device. The housings include trackpads 812 and 822. The trackpads 812 and 822 illustrate the active area of a capacitive trackpad region. The active trackpad region may be implemented as a multi-layer capacitive sensor, with this area being substantially filled with one or more high conductivity layers that are not transparent to RF transmission. The antenna assemblies 816 and 828 each represent an array of high frequency antenna elements. The antenna elements can be arranged in any of antenna locations illustrated at housing 810 and at cosmetically disguised at housing 820.

On the housing 810, a trackpad 812 and a keyboard 814 are illustrated. The trackpad 812 is surrounded by four regions 816A, 816B, 816C, and 816D around the perimeter of the active trackpad 812, outside of the trackpad conductor regions of the active trackpad 812 where input can be sensed. One or more of these regions 816A, 816B, 816C, and 816D may be used to place antenna elements, or arrays of antenna elements. Similarly, on the housing 820, a trackpad 822 and a keyboard 824 are illustrated. The trackpad 822 is surrounded by four regions 828A, 828B, 828C, and 828D around the perimeter of the active trackpad 822, outside of the trackpad conductor regions of the active trackpad 822 where input can be sensed. The trackpad 822 and the four regions 828A, 828B, 828C, and 828D may completely covered by a cosmetic overlay 826. The cosmetic overlay 826 appears to a user as one trackpad. However, a region between the outer edge of the region 826 and the outer edge of the trackpad 822 can be used to deploy one or more antenna elements or antenna arrays in the regions 828A, 828B, 828C, and 828D. The cosmetic overlay 826 would not enable trackpad functionality in the areas where the four regions 828A, 828B, 828C, and 828D are disposed. However, the trackpad 822 would enable input functionality via the cosmetic overlay 826.

In embodiments, trackpad devices are often the order of 2-3 millimeters thick. High frequency antenna arrays and radio front ends can be constructed in less than or equal to a thickness of approximately 2 mm, and substantially thinner if multiple FPC antenna elements or feeds are used and routed to remote RF front end parts. Accordingly, integrating the antennas into regions surrounding a trackpad does not yield any increase of thickness. The present techniques instead enable a dual use of an unused perimeter region that is typically reserved for trackpad support. Thus, the perimeter internal device space around trackpads that is often unused in many devices can be used for antenna sharing without any adverse impact on other critical device subsystem volumes, such as batteries. As follows, the antenna may be located in a region adjacent to the trackpad. Alternatively, the antenna may be located in a region immediately adjacent to the trackpad. Immediately adjacent may be referred to as adjoining, abutting, or sharing a border.

The trackpad may include full conductivity copper traces in a grid format in multiple layers. In operation, the trackpad is used to sense the movement of a user fingertip or stylus across the intersection of copper traces in the grid format. Trackpads operate at very low frequencies, in the range of 100 kilohertz (kHz). As a result, the present techniques enable placement of high frequency circuitry near very low frequency input devices, such as trackpads. This placement is the result of the massive differences in operation frequency between touch circuits and the millimeter-wave radio circuits.

In the internal volume of an electronic device, there may be a region around the perimeter of a trackpad can be used for mechanical mounting. In embodiments, the antenna elements can be integrated with the mechanical mounting used to secure the trackpad within the housing of the electronic device. Additionally, in embodiments the antenna elements can be coupled with a mechanical mounting used to secure any internal device components within the housing of the electronic device. Screws or snaps of the mechanical mounting may be reconfigured to accommodate a high frequency antenna. As used herein, a mechanical mounting refers to attachment means such as screws, plastic snaps, retaining clips, and the like. While the FIG. 8 illustrates the antenna elements surrounding the trackpad of a device, the antenna elements may also be located around the keyboard or any other component located on the device. For example, the antenna elements may be positioned around or near a fingerprint scanner of the electronic device.

Figure 9:
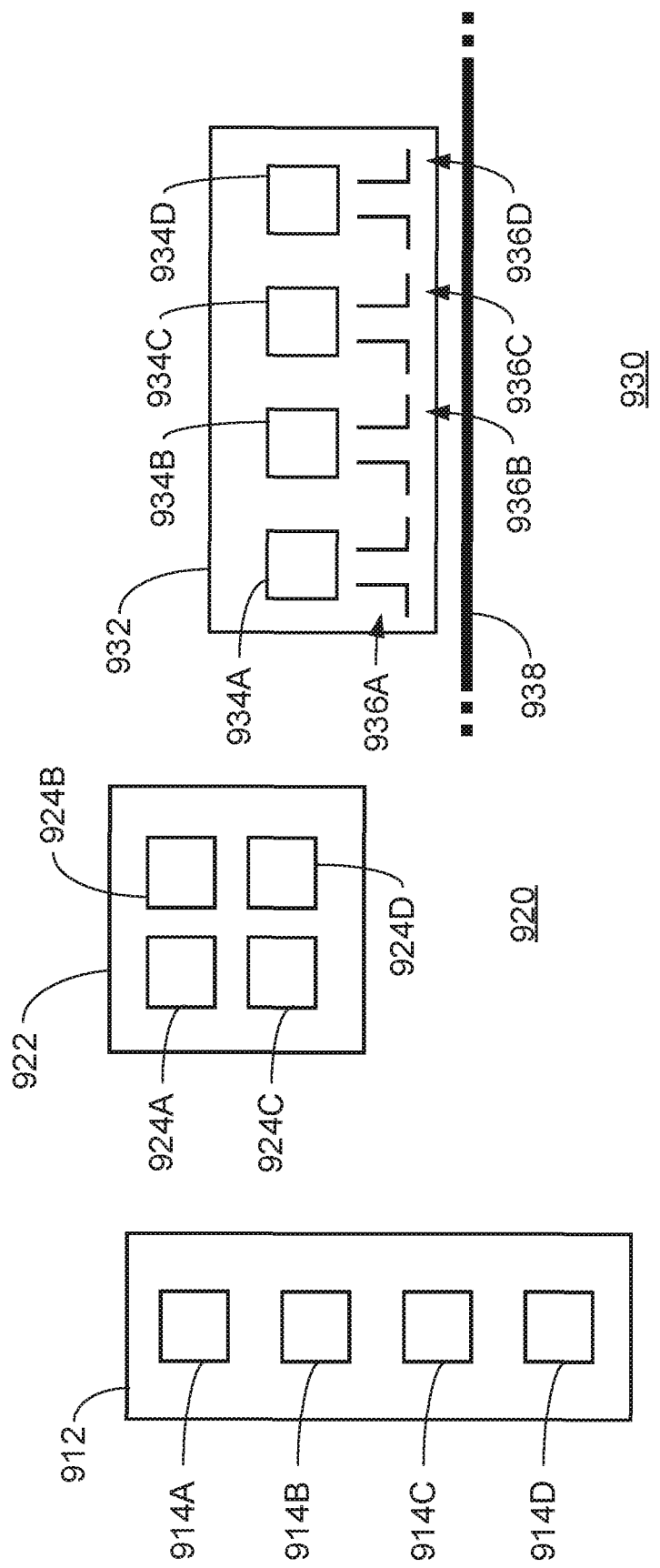
FIG. 9 is an illustration of antenna array configurations that may be disposed around or near components of a computing device.

FIG. 9 is an illustration of antenna array configurations 900 that may be disposed around or near components of a computing device. Configurations 910, 920, and 930 illustrate three different antenna array configurations 900 that could be deployed around part of a trackpad perimeter to optimize dual use of device volume. The linear element configuration 910 could be deployed in any of the candidate locations exposed in FIG. 8.

The antennas of FIG. 9 are illustrated as patch antenna elements, however, any type of antenna may be used according to the present techniques. The configuration 910 includes a region 912 that surrounds a patch 914A, patch 914B, patch 914C, and patch 914D. The configuration 920 includes a region 922 that surrounds a patch 924A, patch 924B, patch 924C, and patch 924D. The configuration 930 includes a region 932 that surrounds a patch 934A, patch 934B, patch 934C, and patch 924D. The configuration 930 includes a dipole 936A, dipole 936B, dipole 936C, and dipole 936D. The line 938 represents an edge of a device housing including the configuration 930. The two dots at either end of the line 938 are used to indicate the edge of the device housing extends beyond what is illustrated. While only the configuration 930 includes an illustration of the edge of the device housing, any configuration described can be located near an edge of the device housing.

This linear distribution as illustrated by the configuration 910 of array elements minimizes the width of each array when integrated around or near an internal device component, such as a trackpad 812 or 822 in FIG. 8. The square configuration 920 of array elements enables a different utilization of internal device volume when compared to configuration 910. The particular configuration used may depend on the unique space utilization for a particular device configuration. Internal device volume and cosmetic factors could, for example, necessitate a linear approach deployed on the long edges of the trackpad and the square configuration on the short edges. In some examples, the configuration 920 may be used in the middle of the long edge of a trackpad, or in the middle of the short edge of a trackpad as illustrated in FIG. 8. The configurations described herein are exemplary and should not be limiting on the present techniques.

The 8-element array illustrated at configuration 930 combines two different antenna element topologies (patches and dipoles) to take advantage of polar pattern differences between antenna element topologies. The configuration 930 may be deployed along the lower long edge of the trackpad, with the patches having a polar pattern extending from the XY plane, and the dipoles focused on a YZ plane. The array of patches and the array of dipoles could be treated as separate, independent antennas by the RF circuitry. Thus, configuration 930 may be used to illustrate one 8-element antenna array or two different 4-element arrays. While a particular number of arrays are illustrated, any number of antenna arrays may be formed according to the present techniques. Moreover, although not illustrated, configurations 910 and 920 may also include antennas such as patch antennas and slot antennas. Although particular antenna topologies are described, any antenna configuration can be used according to the present techniques. The present techniques are topology-agnostic. The antennas may be a patch antenna, dipole, monopole, loop, or any combination thereof. Additionally, the 'ideal' polar patterns of dipole antennas will be perturbed and distorted by each unique product embodiment. Combining fundamentally different antenna topologies in the array (e.g. patches and dipoles) enables a different array coverage pattern than an array consisting only of one type of antenna topology.

FIG. 10 is a block diagram of an example of a computing system that includes high frequency antenna integration. The example system 1000 includes a computing device 1002. The computing device 1002 includes a processing unit 1004, a system memory 1006, and a system bus 1008. In some examples, the computing device 1002 can be a gaming console, a personal computer (PC), an accessory console, a gaming controller, among other computing devices. In some examples, the computing device 1002 can be a node in a cloud network. The components of the computing device 1002 may be a plurality of electronic components operable to realize computing functionality as described below. However, the present techniques are not limited to the electronic components as described herein.

The system bus 1008 couples system components including, but not limited to, the system memory 1006 to the processing unit 1004. The processing unit 1004 can be any of various available processors. Dual microprocessors and other multiprocessor architectures also can be employed as the processing unit 1004. In embodiments, processing units may be considered electronically noisy devices as described here.

The system bus 1008 can be any of several types of bus structure, including the memory bus or memory controller, a peripheral bus or external bus, and a local bus using any variety of available bus architectures known to those of ordinary skill in the art. The system memory 1006 includes computer-readable storage media that includes volatile memory 1010 and nonvolatile memory 1012.

The basic input/output system (BIOS), containing the basic routines to transfer information between elements within the computer 1002, such as during start-up, is stored in nonvolatile memory 1012. By way of illustration, and not limitation, nonvolatile memory 1012 can include read-only memory (ROM), programmable ROM (PROM), electrically programmable ROM (EPROM), electrically erasable programmable ROM (EEPROM), or flash memory.

Volatile memory 1010 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computer 1002 also includes other computer-readable media, such as removable/non-removable, volatile/nonvolatile computer storage media. FIG. 10 shows, for example a disk storage 1014. Disk storage 1014 includes, but is not limited to, devices like a magnetic disk drive, floppy disk drive, tape drive, Jaz drive, Zip drive, flash memory card, or memory stick.

In addition, disk storage 1014 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1014 to the system bus 1008, a removable or non-removable interface is typically used such as interface 1016.

It is to be appreciated that FIG. 10 describes software that acts as an intermediary between users and the basic computer resources described in the suitable operating environment 1000. Such software includes an operating system 1018. Operating system 1018, which can be stored on disk storage 1014, acts to control and allocate resources of the computer 1002.

System applications 1020 take advantage of the management of resources by operating system 1018 through program modules 1022 and program data 1024 stored either in system memory 1006 or on disk storage 1014. It is to be appreciated that the disclosed subject matter can be implemented with various operating systems or combinations of operating systems.

Algorithmic

A user enters commands or information into the computer 1002 through input devices 1026. Input devices 1026 include, but are not limited to, a pointing device, such as, a mouse, trackball, trackpad, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 1026 connect to the processing unit 1004 through the system bus 1008 via interface ports 1028. Interface ports 1028 include, for example, a serial port, a parallel port, a game port, and a universal serial bus (USB). Antenna elements may be integrated into components surrounding, shielding, or supporting the electronic components such as interface ports 1028 or input device(s) 1026 as described above.

Output devices 1030 use some of the same type of ports as input devices 1026. Thus, for example, a USB port may be used to provide input to the computer 1002 and to output information from computer 1002 to an output device 1030.

Output adapter 1032 is provided to illustrate that there are some output devices 1030 like monitors, speakers, and printers, among other output devices 1030, which are accessible via adapters. The output adapters 1032 include, by way of illustration and not limitation, video and sound cards that provide a means of connection between the output device 1030 and the system bus 1008. It can be noted that other devices and systems of devices provide both input and output capabilities such as remote computing devices 1034. The output devices 1030 can also include any suitable fabrication device, such as a three-dimensional printer, which can generate three dimensional objects based on fabrication instructions transmitted from the computer 1002. In some cases, antenna elements may be integrated into components surrounding, shielding, or supporting the output adapter(s) 1032 as described above.

The computer 1002 can be a server hosting various software applications in a networked environment using logical connections to one or more remote computers, such as remote computing devices 1034. The remote computing devices 1034 may be client systems configured with web browsers, PC applications, mobile phone applications, and the like. The remote computing devices 1034 can be a personal computer, a server, a router, a network PC, a workstation, a microprocessor-based appliance, a mobile phone, a peer device or other common network node and the like, and typically includes many or all of the elements described relative to the computer 1002.

Remote computing devices 1034 can be logically connected to the computer 1002 through a network interface 1036 and then connected via a communication connection 1038, which may be wireless. Network interface 1036 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 1038 refers to the hardware/software employed to connect the network interface 1036 to the bus 1008. While communication connection 1038 is shown for illustrative clarity inside computer 1002, it can also be external to the computer 1002. The hardware/software for connection to the network interface 1036 may include, for exemplary purposes, internal and external technologies such as, mobile phone switches, modems including regular telephone grade modems, cable modems and DSL modems, ISDN adapters, and Ethernet cards. In some cases, communication connection 1038 may access or communicate with the network interface 1036 wirelessly, via a high frequency antenna. The antenna elements may be physically integrated into components such as the device housing and electrical subsystem as described herein.

The computer 1002 can further include a radio 1040. For example, the radio 1040 can be a wireless local area network radio that may operate one or more wireless bands. For example, the radio 1040 can operate on the industrial, scientific, and medical (ISM) radio band at 2.4 GHz or 5 GHz. In some examples, the radio 1040 can operate on any suitable radio band at any radio frequency. In embodiments, the radio 1040 may operate within a high frequency band from 24 GHz to 40 GHz, via a high frequency antenna. Thus, the radio 1040 may enable mmWave communications. The antenna elements used in radio communication may be physically integrated into components such as the device housing and electrical subsystem.

The computer 1002 includes one or more modules 1022, such as an algorithmic antenna support module 1042. The algorithmic antenna support module 1042 may be configured to enable beam forming according to the particular antenna configuration and topology of the computer 1002. Moreover, the algorithmic antenna support module 1042 may be configured to enable switching between a plurality of antenna arrays to optimize RF link performance.

It is to be understood that the block diagram of FIG. 10 is not intended to indicate that the computing system 1002 is to include all of the components shown in FIG. 10. Rather, the computing system 1002 can include fewer or additional components not illustrated in FIG. 10 (e.g., additional applications, additional modules, additional memory devices, additional network interfaces, etc.).

EXAMPLES

Example 1 is an electronic device. The electronic device includes a trackpad, wherein the trackpad is configured in a housing to receive input; at least one antenna element operable in a high frequency range integrated into a region adjacent to the trackpad, wherein at least a portion of the region is transparent to radio wave transmission enabling a dual use of the region.

Example 2 includes the electronic device of example 1, including or excluding optional features. In this example, the region is a mechanical mounting region wherein the trackpad is secured in a position within the housing.

Example 3 includes the electronic device of any one of examples 1 to 2, including or excluding optional features. In this example, the region is an inside perimeter of the trackpad and the at least one antenna element is disposed beneath the trackpad surface.

Example 4 includes the electronic device of any one of examples 1 to 3, including or excluding optional features. In this example, the at least one antenna element is a flexible printed circuit (FPC) antenna.

Example 5 includes the electronic device of any one of examples 1 to 4, including or excluding optional features. In this example, the at least one antenna element is a low-temperature cofired ceramics (LTCC) antenna.

Example 6 includes the electronic device of any one of examples 1 to 5, including or excluding optional features. In this example, the at least one antenna element is disposed near a single edge of the trackpad.

Example 7 includes the electronic device of any one of examples 1 to 6, including or excluding optional features. In this example, the electronic device includes a plurality of antenna elements disposed along an entire perimeter of the trackpad.

Example 8 includes the electronic device of any one of examples 1 to 7, including or excluding optional features. In this example, the electronic device includes a plurality of antenna elements disposed along an entire perimeter of the trackpad, wherein a portion of the antenna elements form a first antenna array and another portion of the antenna elements form a second antenna array.

Example 9 includes the electronic device of any one of examples 1 to 8, including or excluding optional features. In this example, the at least one antenna element and the trackpad are covered by a cosmetic overlay visible through the housing.

Example 10 includes the electronic device of any one of examples 1 to 9, including or excluding optional features. In this example, the at least one antenna element is fabricated via a printing process.

Example 11 is a system. The system includes at least one antenna element; a substrate; an electronic component coupled with the substrate; and a housing, wherein the at least one antenna element is integrated with an internal structure of the housing, and at least one of the substrate or the electronic component is associated with the internal structure enabling a dual use of the internal structure.

Example 12 includes the system of example 11, including or excluding optional features. In this example, the internal structure is a shield can that is configured to shield radio waves released from the electronic component from interference with another electronic component in the housing.

Example 13 includes the system of any one of examples 11 to 12, including or excluding optional features. In this example, the at least one antenna element is a slot antenna disposed in an aperture of the shield can.

Example 14 includes the system of any one of examples 11 to 13, including or excluding optional features. In this example, the at least one antenna element is a slot antenna disposed in an aperture of the shield can, and a grounding structure of the antenna is disposed near the aperture to shield radio waves released from the electronic component from interference with another electronic component in the housing.

Example 15 includes the system of any one of examples 11 to 14, including or excluding optional features. In this example, the internal structure is a bezel region and the electronic component is a display panel, and the at least one antenna element is disposed within the bezel region and electrically coupled to the substrate.

Example 16 includes the system of any one of examples 11 to 15, including or excluding optional features. In this example, the internal structure is a bezel region and the electronic component is a display panel, comprising: the at least one antenna element disposed within the bezel region and electrically coupled to the substrate, wherein the at least one antenna element is positioned to transmit and receive radio waves through a side wall of the housing; and another antenna element disposed within the bezel region and electrically coupled to the substrate, wherein the another antenna element is positioned to transmit and receive radio waves through a display glass of the housing.

Example 17 includes the system of any one of examples 11 to 16, including or excluding optional features. In this example, the internal structure is a bezel region and the electronic component is a display panel, comprising: the at least one antenna element disposed within the bezel region and electrically coupled to the substrate, wherein the at least one antenna element is a first independent antenna array positioned to transmit and receive radio waves through a side wall of the housing; and a second independent antenna array disposed within the bezel region and electrically coupled to the substrate, wherein the another antenna element is positioned to transmit and receive radio waves through a display glass of the housing.

Example 18 is an apparatus. The apparatus includes a housing, wherein a plurality of electronic components is disposed within the housing and a portion of the housing comprises a region of metallization with a plurality of apertures that form at least one slot antenna array.

Example 19 includes the apparatus of example 18, including or excluding optional features. In this example, a portion of the plurality of apertures form a first slot antenna array and another portion of the plurality of apertures form a second slot antenna array.

Example 20 includes the apparatus of any one of examples 18 to 19, including or excluding optional features. In this example, the plurality of apertures is designed to enable a particular gain and directivity of the at least one slot antenna array.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. An apparatus, comprising:
   one or more electronic components configured to generate electromagnetic noise in a first frequency range;
   a shield can having a can surface separating an interior and an exterior of the shield can, the shield can containing the one or more electrical components within the interior, the shield can being configured to shield the electromagnetic noise generated in the interior in the first frequency range from the exterior and including a plurality of apertures formed in the can surface from which a radio frequency electromagnetic signal emanates in a second frequency range to the exterior, the second frequency range being higher than the first frequency range; and
   a conductive grounding ring positioned around each aperture.

2. The apparatus of claim 1, wherein the plurality of apertures includes slot antennas from which the radio frequency electromagnetic signal radiates in the second frequency range.

3. The apparatus of claim 1, wherein the one or more electronic components include at least one electronic component that radiates the radio frequency electromagnetic signal in the second frequency range and each of the apertures is sized to pass the radio frequency electromagnetic signal in the second frequency range from the interior to the exterior and to shield the electromagnetic noise from the exterior in the first frequency range.

4. The apparatus of claim 3, wherein each of the apertures is further shaped to pass the radio frequency electromagnetic signal in the second frequency range from the interior to the exterior and to shield the electromagnetic noise from the exterior in the first frequency range.

5. The apparatus of claim 1, wherein the plurality of apertures includes slot antennas in the can surface and the one or more electronic components include a transmitter within the interior, wherein the transmitter is configured to generate a radiofrequency current to drive the slot antennas in the can surface to radiate the radio frequency electromagnetic signal in the second frequency range to the exterior.

6. The apparatus of claim 1, wherein the one or more electronic components includes an antenna and a transmitter within the interior, wherein the transmitter is configured to generate a radiofrequency current to drive the antenna to radiate the radio frequency electromagnetic signal in the second frequency range.

7. The apparatus of claim 1, wherein the shield can is made from one or more conductive materials.

8. The apparatus of claim 1, wherein the can surface includes multiple faces, and the plurality of apertures are positioned on more than one face of the can surface.

9. The apparatus of claim 1, wherein the plurality of apertures forms an array of slot antennas in the can surface, the array of slot antennas emanating the radio frequency electromagnetic signal in the second frequency range, the second frequency range corresponding to mmWave communications.

10. The apparatus of claim 1, wherein the conductive grounding ring is positioned in the interior of the shield can.

11. The apparatus of claim 1, wherein the conductive grounding ring is an electrically conductive grounding ring positioned in the interior of the shield can around each aperture in direct electrical contact with the can surface.

12. A computing device, comprising:
    a printed circuit board;
    one or more electronic components mounted on the printed circuit board and configured to generate electromagnetic noise in a first frequency range; and
    a shield can mounted on the printed circuit board and having a can surface separating an interior and an exterior of the shield can, the shield can containing the one or more electrical components within the interior, the shield can being configured to shield the electromagnetic noise generated in the interior in the first frequency range from the exterior and including a plurality of apertures formed in the can surface from which a radio frequency electromagnetic signal emanates in a second frequency range to the exterior, the second frequency range being higher than the first frequency range;
    a conductive grounding ring positioned around each aperture.

13. The computing device of claim 12, wherein the plurality of apertures includes slot antennas from which the radio frequency electromagnetic signal radiates in the second frequency range.

14. The computing device of claim 12, wherein the one or more electronic components include at least one electronic component that radiates the radio frequency electromagnetic signal in the second frequency range, and each of the apertures is sized to pass the radio frequency electromagnetic signal in the second frequency range from the interior to the exterior and to shield the electromagnetic noise from the exterior in the first frequency range.

15. The computing device of claim 14, wherein each of the apertures is further shaped to pass the radio frequency electromagnetic signal in the second frequency range from the interior to the exterior and to shield the electromagnetic noise from the exterior in the first frequency range.

16. The computing device of claim 12, wherein the shield can is made from one or more conductive materials.

17. The computing device of claim 12, wherein the can surface includes multiple faces, and the plurality of apertures are positioned on more than one face of the can surface.

18. The computing device of claim 12, wherein the plurality of apertures forms an array of slot antennas in the can surface, the array of slot antennas emanating the radio frequency electromagnetic signal in the second frequency range, the second frequency range corresponding to mmWave communications.

19. The computing device of claim 12,
    wherein the conductive grounding ring is positioned in the interior of the shield can.

20. The computing device of claim 12,
    wherein the conductive grounding ring is an electrically conductive grounding ring positioned in the interior of the shield can around each aperture in direct electrical contact with the can surface.

21. The computing device of claim 12, further comprising:
- an antenna component operable to generate the emanated signal in the second frequency range; and
- a substrate coupled to the antenna component, wherein the substrate includes the conductive grounding ring.

22. The computing device of claim 21, wherein the substrate is coupled to an internal surface of the shield can.

23. The computing device of claim 21, wherein the substrate further comprises radiofrequency front-end circuitry including one or more of gain shifters, phase shifters, and amplifiers.

24. The computing device of claim 21, wherein the substrate further comprises a continuous layer of ground.

25. The computing device of claim 24, wherein the continuous layer of ground is the same size as the aperture.

26. The computing device of claim 12, wherein the grounding ring surrounds the aperture but does not intrude into an opening of the aperture.

\* \* \* \* \*